April 1, 1941.　　　L. G. SWANSON　　　2,237,203
POULTRY AND FOWL SHEAR
Filed Dec. 29, 1937　　　2 Sheets-Sheet 1
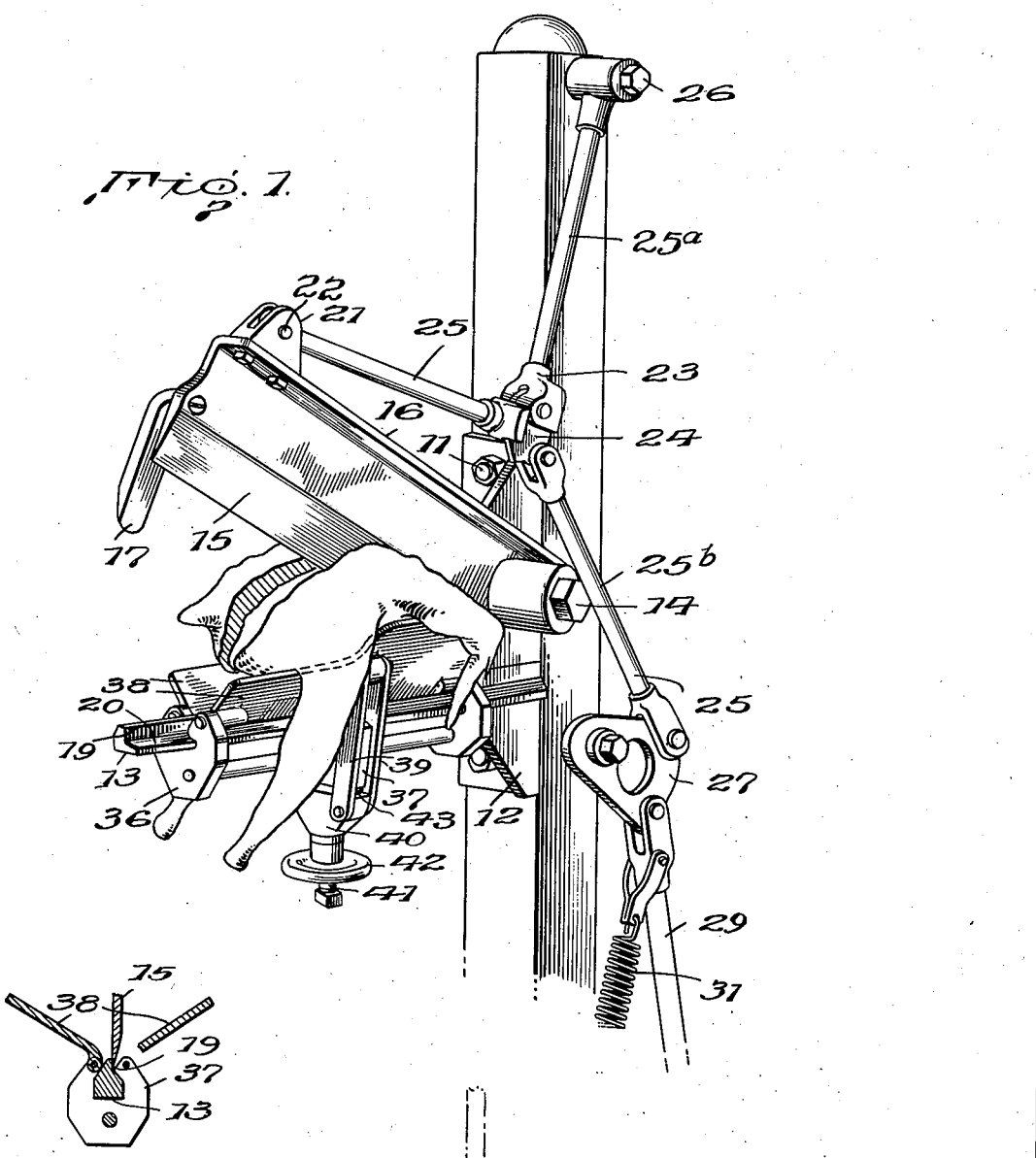
Inventor
Levi G. Swanson,
By Bernard F. Garvey
Attorney

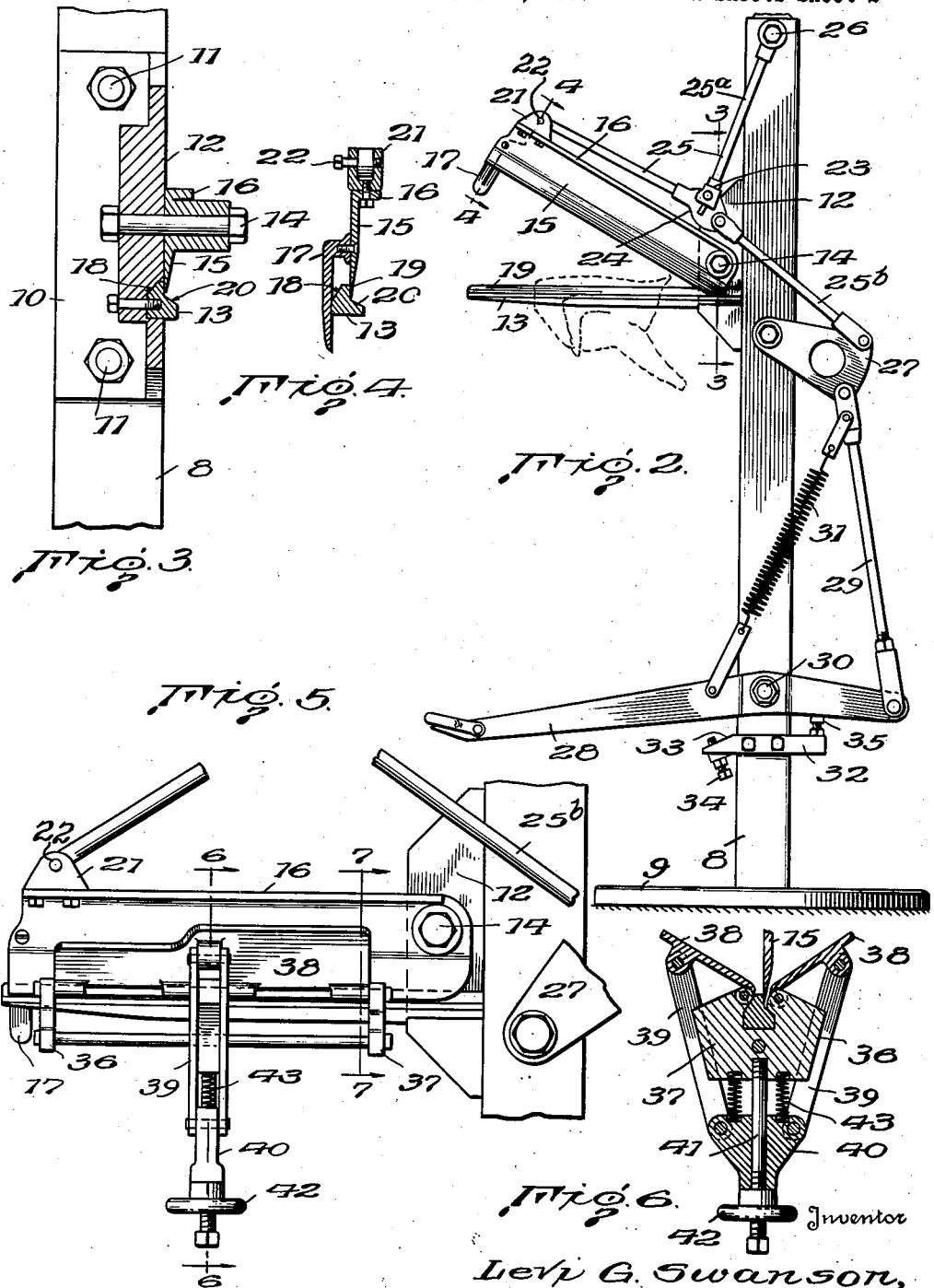

Patented Apr. 1, 1941

2,237,203

UNITED STATES PATENT OFFICE 2,237,203

POULTRY AND FOWL SHEAR

Levi George Swanson, Perry, Iowa

Application December 29, 1937, Serial No. 183,284

9 Claims. (Cl. 17—11)

The present invention consists of a machine for full dressing fowl, an object of which is to permit the fowl to be longitudinally incised preparatory to evisceration, after which the incision may be closed, or, if desired, the machine may be used for dissecting the fowl without the use of extraneous means.

Fowl or poultry which is required to undergo Government inspection for disease lesions must be examined before removal of the head or feet. With the present invention, the fowl may be threaded, prior to evisceration, from either end, on a line parallel to the backbone, then conveniently and completely eviscerated without cutting or disengaging the intestines, liver and lungs, leaving them intact for inspection.

It is within the contemplation of this invention to provide a machine simple in operation for incising a fowl through the backbone in a manner to facilitate evisceration without danger of puncturing the viscera, the invention also including means to positively hold the fowl from displacement while the latter is cut in two, the apparatus used for carrying out the teaching of this invention being so constructed that cleansing and sterilization of the parts thereof may be effected expeditiously even by an unskilled person.

Other objects of the invention will be apparent from the following description of the present preferred form of the invention taken in connection with the accompanying drawings, wherein:

Fig. 1 is a perspective view of the upper part of the machine constructed in accordance with the present invention showing the fowl supporting trough mounted on the fixed blade, a fowl being shown in position in the trough, the movable blade being in an upward or open position, Fig. 2 is a side elevational view of a machine constructed in accordance with the present invention with the movable blade in an open position, a fowl being shown in dotted lines on the fixed blade, Fig. 3 is a detail fragmentary sectional view taken on the line 3—3 of Fig. 2, looking in the direction of the arrows, illustrating to advantage the manner of pivotally mounting the movable blade to the support, Fig. 4 is a detail fragmentary sectional view taken on the line 4—4 of Fig. 2, looking in the direction of the arrows, showing to advantage the restraining means, as the latter appears when the movable blade is in engagement with the fixed blade, Fig. 5 is a detail fragmentary side elevational view of the fixed blade with the fowl supporting trough mounted thereon and the movable blade in a closed position in the trough, Fig. 6 is a detail fragmentary sectional view taken on the line 6—6 of Fig. 5, looking in the direction of the arrows, Fig. 7 is likewise a detail fragmentary sectional view taken on the line 7—7 of Fig. 5, looking in the direction of the arrows, a portion thereof being broken away to disclose details, and Fig. 8 is an end elevational view of the fixed blade.

A preferred form of the invention, illustrated in the drawings, consists of a vertical standard 8 mounted on a base 9, the standard and base being of any desired configuration. Preferably, however, the upper end of the standard is rectangular to provide a flat supporting surface. Mounted on one face of the standard 8 is a plate 10 which may be bolted or otherwise detachably secured to the standard, as indicated at 11. A portion of one margin of the plate is bent at right angles, as indicated at 12. The lower end of the right angle portion of the plate 12 supports a fixed blade or bar 13, the latter projecting outwardly from and at right angles to the standard 8, as illustrated to advantage in Fig. 2. Pivotally mounted on the right angle portion of the plate 10, as indicated at 14, is one end of a movable blade 15, the upper edge of the latter being bent at right angles to provide a flange 16. The free end of the blade 15 is equipped with suitable restraining means to prevent relative lateral displacement of the blades under stress, permitting the use of relatively light metals in the blade. The means in the present instance consists preferably of a restraining finger 17, one end of which is secured to one side of the blade 15, as shown to advantage in Fig. 4. The free end of the finger extends downwardly beyond the lower or cutting edge of the blade and is adapted to wipe over and lie in contact with one face of the fixed blade 13 when said blades are in a closed position, as shown in Fig. 4. It will be noted that the upper wall of the fixed blade 13 is beveled at one side, as indicated at 18, to facilitate movement of the restraining finger 17 thereacross. The opposite wall of the blade 13 has a portion thereof removed to provide an incising edge 19 likewise providing an abutment wall 20 against which the fowl may be impinged during the cutting action of the blade 15.

The upper face of the free end of the flange 16 has a bracket 21 detachably secured thereto, the bracket being U-shaped in cross section and being pivotally engaged, through the medium of a pin 22, with one end of a link 25 of a leverage unit, generally designated 23. The leverage unit consists of a link 25, a web 24 integral therewith, link 25a and a connecting link or rod 25b. The inner ends of link 25a and connecting link 25b are pivotally connected to the web 24. The outer end of the link 25a is pivotally engaged, as indicated at 26, with the standard 8, while the outer end of the remaining connecting link 25b is pivotally engaged to a link plate 27, the latter being also pivotally connected to the standard 8. The link plate 27 is operatively connected to a foot treadle 28 through a connecting rod 29, the treadle being pivotally connected to the standard 8, as indicated at 30. The foot engaging end of the treadle 28 is normally held in an upward position by a contractural spring 31 which latter is engaged with the treadle and the connecting rod 29, as shown to advantage in Fig. 2. The spring 31 also exerts force on the link plate 27 so as to normally hold the blade 15 in an upward or open position. The blade is operated by exerting pressure on the foot end of the treadle 28, which action urges the blade downwardly against the resistance of the spring 31. The standard 8, immediately below the axis of the treadle 28, is provided with an abutment block 32, the upper face of one end of which is beveled, as indicated at 33, the beveled face having a screw 34 extending therethrough. By this means the extent of downward movement of the treadle 28 may be regulated which correspondingly regulates the extent of downward movement of the blade 15, also providing sufficient clearance of the abutment 20. If desired, an adjustable means 35 may also be mounted in the heel of the plate or block 32 for the purpose of limiting the opening extent of the blade 15.

For the purpose of completely slitting a fowl, if desired for frying, I provide a trough, generally designated 36. In the present instance the trough consists of a frame which complements the bar or blade 13 and is adapted to be slidably mounted on the latter. The frame includes plates 37 to which sides 38 of the trough are hingedly mounted. As shown to advantage in Fig. 5, the inner ends of the sides 38 are wider than the outer ends, said inner ends adapted to receive thereover the wings of the fowl, while the outer ends are adapted to receive the legs, as shown to advantage in Fig. 1. The sides 38 are adjustable so as to conform to different sizes of fowls. The adjusting means illustrated in the drawings, consists of links 39, one end of each of which is hinged to one of the sides 38, the opposite end being hinged to a travelling block 40 which is movably mounted on a bolt 41, the outer end of the latter having its shank threaded for engagement with a corresponding nut 42. The block 40 is normally urged away from the trough frame by springs 43. It is, of course, to be understood that various other means may be employed to adjust the sides 38, the present embodiment being only for purposes of illustration.

In using the present machine, when a fowl is to be eviscerated, it is threaded preferably on a horizontal bar, the bar being passed through an incision adjacent the vent at one end of the fowl or else through an incision above the crop at the opposite end of the fowl. In this way the bar may be threaded on a line parallel with the backbone of the fowl permitting the viscera to gravitate toward the breast. While in this position a cutting element may be urged through the vertebrae of the fowl and against the bar supporting the latter. When using a preferred form of machine, as illustrated in the drawing, the fowl may, either before or after decapitation, be threaded on the blade or bar 13, in which position the straight, blunt, top face of the latter is in parallel relation to the backbone of the fowl. After this, pressure is exerted by the foot on the treadle 28 so as to urge the blade 15 into engagement with the back of the fowl, the blade 15 having a shearing action with the blade 13. The extent of movement of the blade 15 is determined by screws 34 and 35. 34 gives adjustment of clearance between the blade 15 and abutment 20. 35 gives adjustment for complete opening of the blade 15. At the same time lateral displacement of the blades 13 and 15 is prevented by the restraining finger 17 notwithstanding the stress which may be imposed on the blades.

Manifestly with the fowl incised in this manner, evisceration is a simple process.

After evisceration, the incision may be skewered or sewed if it should be desired to cook the fowl whole. On the other hand, if it is desired to cut the fowl in two, preparatory to cooking, the trough 36 is then mounted on the blade 13 and the fowl placed in the trough, breast down, following which the sides of the trough are adjusted to the desired position and the blade 15 operated in an obvious manner. By this single operation the fowl is completely slitted longitudinally.

It is to be understood that various changes may be made in the details of construction, proportion and arrangement of parts within the scope of the claims hereto appended.

I claim:

1. A poultry and fowl shear including blades, one of which is fixed and the other movable, a fowl supporting trough carried by the fixed blade, and means for operating said movable blade to urge the cutting edge of the latter into the zone of the trough for incising a fowl mounted in the latter.

2. A machine for use in dressing fowl including a bar slidable longitudinally through a fowl parallel to the backbone of the latter, a portion of the bar being removed to provide an incising edge and an abutment adjacent said edge, and a blade operatively connected to the bar and movable into shearing relationship with the incising edge of the bar just short of engagement with said abutment for splitting the fowl through the backbone.

3. A machine for use in dressing fowl including a bar slidable longitudinally through a fowl parallel to the backbone of the latter, a blade operatively connected to the bar and movable into engagement with the latter for incising the fowl through the backbone, and a trough slidably mounted on said bar and shaped to accommodate the breast of the fowl, said movable blade being operable into said trough for incising the fowl through the breast.

4. The same as claim 3 with the sides of the trough adjustable to vary the size of the trough for adapting the latter to support fowls of different sizes.

5. A machine for use in dissecting fowl including a fixed blade and a movable blade pivotally connected to the fixed blade, means for operating the pivoted blade into co-action with the fixed blade, and a restraining means to prevent lateral displacement of said blades under stress, including an element carried by the movable blade and adapted to wipe over and lie contiguous to one side of the fixed blade when the movable blade is urged into contact with the latter.

6. A machine for use in dressing fowl including a bar adapted to be longitudinally threaded through a fowl in proximity to the backbone and to lie parallel to the latter, said bar having a relatively broad flat upper surface engageable with the inside of said backbone, and means movably connected to the bar and operable into engagement with the latter, along the side of said flat upper surface, for splitting the fowl through the backbone.

7. Means for use in dressing fowl including a bar adapted to be threaded through a fowl parallel to the vertebra, the bar being adapted to be in contiguity to the vertebra, and means for splitting the fowl through the vertebra while the fowl is mounted on the bar, a portion of said bar being removed to provide an abutment for the fowl splitting means.

8. Means for dressing fowl including a blade having a flat upper surface one side of which is beveled outwardly, the other side extending straight for a distance, to provide an incising edge, and then issuing into an outwardly inclined portion, and a second blade in pivotal connection with the first mentioned blade and operable in shearing relation with the incising edge of the latter and means carried by said first blade and engageable with the outwardly beveled portion of the latter to prevent relative lateral movement of said blades.

9. A poultry and fowl shear including a support, blades, for splitting the fowl longitudinally, mounted on the support, one end of one of said blades being anchored in proximity to an end of the other blade to effect a shearing action of the blades when the latter are urged together, a detachable fowl supporting trough carried by the fixed blade, a pedal carried by the support and operatively connected to the movable blade for urging the latter against the other blade, and means connected to the pedal and blade to normally hold the movable blade spaced from said other blade.

LEVI GEORGE SWANSON.